United States Patent [19]
Yamada

[11] Patent Number: 6,000,005
[45] Date of Patent: Dec. 7, 1999

[54] METHOD OF WRITING A FLASH MEMORY INCLUDING DYNAMICALLY SWITCHING AND ALLOCATING MEMORY SPACES TO THE FLASH MEMORY BLOCKS

[75] Inventor: Yumi Yamada, Tokyo, Japan

[73] Assignee: NEC Corporation, Tokyo, Japan

[21] Appl. No.: 08/905,933

[22] Filed: Aug. 5, 1997

[30]     Foreign Application Priority Data

Aug. 6, 1996  [JP]  Japan ................................. 8-207456

[51] Int. Cl.⁶ ..................................................... G06F 12/02
[52] U.S. Cl. ..................... 711/103; 365/185.33; 711/173; 707/205
[58] Field of Search ................................. 711/103, 165, 711/173; 365/185.33; 707/205

[56]             References Cited

U.S. PATENT DOCUMENTS 5,634,079  5/1997  Buxton ..................................... 395/892

FOREIGN PATENT DOCUMENTS

4-235632   8/1992  Japan .

*Primary Examiner*—Eddie P. Chan
*Assistant Examiner*—Hiep T. Nguyen
*Attorney, Agent, or Firm*—Young & Thompson

[57]             ABSTRACT

Disclosed is a flash memory writing method associated with a computer system constituted by a main apparatus and an external apparatus detachable from the main apparatus, in which, when information stored in a memory inside the external memory is written in a flash memory inside the main apparatus, it is always directly copied regardless of the capacity of the flash memory. More specifically, the memory contents of the flash memory can be erased in units of blocks. The memory in the external apparatus is also divided into blocks, one of which stores an IPL and a flash memory rewrite program. A selector switches assignment of the address space of a CPU in response to a selector operation select signal. When the external apparatus is connected to the main apparatus including the CPU, the address space for starting the IPL is assigned to the block of the memory inside the external apparatus which stores the IPL. After the IPL starts, the flash memory rewrite program takes control. While the address space is switched by the selector, copying of data from one block of the memory inside the external apparatus to one block of the flash memory is repeatedly executed a predetermined number of times.

9 Claims, 9 Drawing Sheets

FIG. 1 PRIOR ART

FIG. 2A PRIOR ART
NO MEMORY CARD

FIG. 2B PRIOR ART
MEMORY CARD EXISTS

FIG. 2C PRIOR ART
IN COPYING

PATTERN 1

ASSIGNMENT OF ADDRESS SPACE

FIG. 4B

MEMORY CONTENTS OF FLASH MEMORY

| FMEM① | NULL |
| FMEM② | NULL |
| FMEM③ | NULL |

FIG. 5A

PATTERN 2

ASSIGNMENT OF ADDRESS SPACE

FIG. 5B

MEMORY CONTENTS OF FLASH MEMORY

FIG. 6A

PATTERN 3

ASSIGNMENT OF ADDRESS SPACE

FIG. 6B

MEMORY CONTENTS OF FLASH MEMORY

FIG. 7A

PATTERN 4

ASSIGNMENT OF ADDRESS SPACE

FIG. 7B

MEMORY CONTENTS OF FLASH MEMORY

FIG. 8A

PATTERN 5

ASSIGNMENT OF ADDRESS SPACE

FIG. 8B

MEMORY CONTENTS OF FLASH MEMORY

FIG. 9

METHOD OF WRITING A FLASH MEMORY INCLUDING DYNAMICALLY SWITCHING AND ALLOCATING MEMORY SPACES TO THE FLASH MEMORY BLOCKS

BACKGROUND OF THE INVENTION

1. Field of the Invention

The present invention relates to a flash memory writing method and, more particularly, to a method of writing data from an external apparatus in a flash memory.

2. Description of the Prior Art

A flash memory is a nonvolatile memory in which memory contents can be electrically erased or written. The flash memory is widely used as a memory for storing the program of an apparatus having a microprocessor because of a relatively low cost and a large capacity.

Operating the microprocessor requires an initial program loader (to be referred to as an IPL hereinafter). When the flash memory is used as a program memory, the IPL must be written therein before mounting on a board. The IPL is written using a memory writer corresponding to each chip of the flash memory.

When the memory contents of the flash memory are to be rewritten due to the presence of a bug in the IPL, or the like, the flash memory is first dismounted from the board, its memory contents are erased, and then memory contents are rewritten using the memory writer again. Write (rewrite) of a program in the flash memory leads to large work cost.

To reduce the work cost of program write in the flash memory, in one method an EPROM storing the IPL is arranged in addition to the flash memory, an address space for the IPL is assigned to the EPROM, and the remaining address space is assigned to the flash memory.

However, since this method uses the EPROM in addition to the large-capacity flash memory capable of providing a sufficient memory space, the part and manufacturing costs are wasted. Rewrite of the IPL itself requires works such as detachment of the EPROM from the board, ultraviolet erasing of the memory contents, data write, and attachment of the EPROM, resulting in large work cost.

In view of this problem, Japanese Unexamined Patent Publication No. 4-235632 discloses a "program loading method". According to this method, an external apparatus storing an IPL is connected via a bus to an apparatus having a microprocessor, and an IPL address space is assigned to a memory in the external apparatus.

This "program loading method" will be described below.

Figure 1:
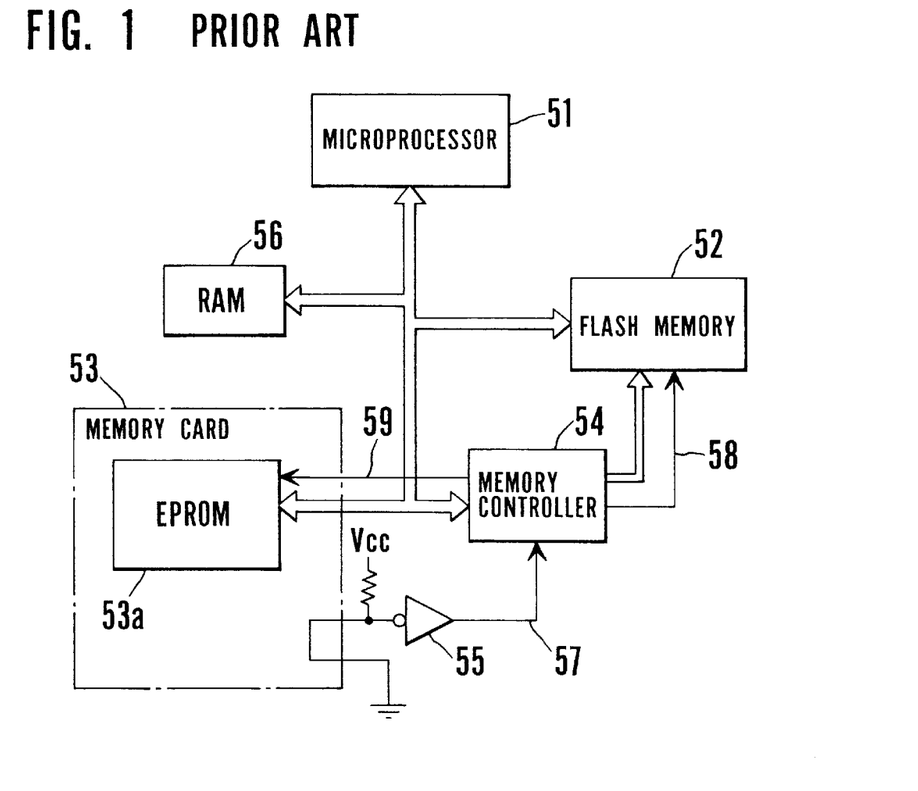
FIG. 1 is a block diagram showing the arrangement of hardware to which a conventional program loading method is applied.

FIG. 1 is a block diagram showing the arrangement of hardware to which the "program loading method" is applied.

Figure 2A:
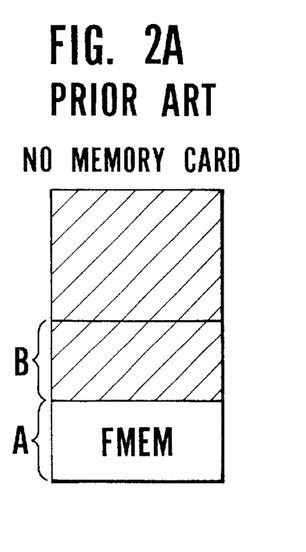
FIGS. 2A, 2B, and 2C are views, respectively, for explaining assignment of an address space in the conventional program loading method.
Figure 2B:
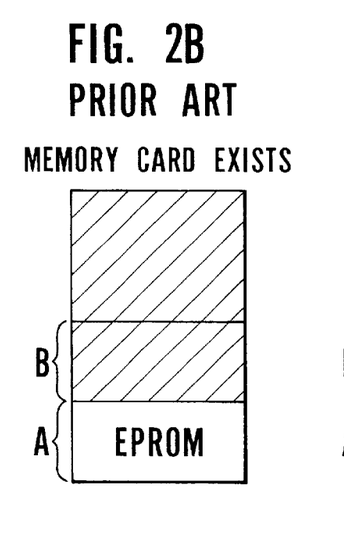
Figure 2C:
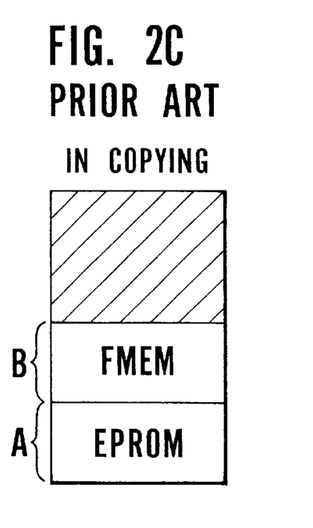

FIGS. 2A, 2B, and 2C are views, respectively, for explaining an example of assignment of the address space in the "program loading method".

In the hardware arrangement shown in FIG. 1, an inverter 55 outputs a memory card presence/absence signal depending on whether a memory card 53 with an EPROM storing an IPL is connected. A memory controller 54 receives a memory card presence/absence signal 57, and outputs either one of chip enable signals 58 and 59 in normal operation. For example, when no memory card is connected, an IPL address space A is assigned to a flash memory (FMEM) 52, as shown in FIG. 2A; when the memory card 53 is connected, the IPL address space A is assigned to an EPROM 53a in the memory card 53, as shown in FIG. 2B. If the memory card 53 is connected, a microprocessor 51 can start the IPL in the EPROM 53a to execute the program.

When information stored in the EPROM 53a is written (copied) in the flash memory 52, the memory controller 54 outputs both the chip enable signals 58 and 59. For example, the address space A is assigned to the EPROM 53a in the memory card 53, whereas an address space B (area not overlapping the address space A) is assigned to the flash memory (FMEM) 52, as shown in FIG. 2C. The microprocessor 51 first erases the memory contents of the flash memory 52, then reads out the IPL in the address space A, and stores it in the address space B. In this manner, write (rewrite) of the IPL in the flash memory 52 can be performed.

This method, however, can be employed only when data to be copied from the EPROM 53a in the memory card 53 to the flash memory 52 occupies ½ or less the whole address space. This is because the address spaces of copy source and destination may not overlap each other. Therefore, when the data to be copied occupies more than ½ the whole address space, the data of the EPROM in the memory card 53 is divided. The divided data are temporarily copied in a RAM 56, and copied from the RAM 56 to the flash memory 52. This method using the RAM 56 as a work area is indirect copying in which the same contents must be copied twice, requiring a processing time about twice that of direct copying. In this method, two programs must be prepared in accordance with the data amount to be copied.

SUMMARY OF THE INVENTION

The present invention has been made to solve the problems in the prior art, and has as its object to provide a flash memory writing method in which (1) a main apparatus can be started by a start program stored in the storage means of an external apparatus, and data can be written in the flash memory in accordance with a write program stored in the storage means of the external apparatus;

(2) the time required to write data in the flash memory can be shortened because the data is directly copied regardless of the data amount; and (3) write to the flash memory can be always processed by the same program regardless of the data amount.

To achieve the above object, according to the present invention, there is provided a flash memory writing method comprising constituting a computer system by a main apparatus and an external apparatus detachable from the main apparatus, arranging, in the main apparatus, processing means having a predetermined address space, switch means for switching assignment of the address space of the processing means, and a flash memory having a storage capacity more than ½ the predetermined address space in which a memory content can be erased in units of blocks each having a size not larger than ⅓ the address space, and an arbitrary address space can be assigned to each block, arranging, in the external apparatus, storage means having a storage capacity larger than ½ the predetermined address space in which an arbitrary address space can be assigned to each block having a size not more than ⅓ the address space, and selection means for controlling switch of assignment of the address space of the switch means, storing a start program for the processing means in at least one block of the storage means, and storing a write program for the flash memory in at least one block of said storage means, using the selection means to control the switch means so as to assign an address space to at least the block of the storage means storing the start program, thereby starting the processing means on the basis of the start program stored in the storage means, and using the selection means to control the switch means so as to assign other address spaces to the block of the storage means storing the write program for the flash memory, at least another block of the storage means, and at least one block of the flash memory, and using the processing means to write a memory content of the block of the storage means assigned with the address space in the block of the flash memory assigned with the address space on the basis of the flash memory write program stored in the storage means.

In the flash memory writing method, the main apparatus can be started by the start program stored in the storage means of the external apparatus, and data can be written in the flash memory by the write program stored in the storage means of the external apparatus.

Since data is always directly copied to the flash memory regardless of the data amount, the time required for write can be shortened. In addition, writes can be always processed by the same program.

When the address space is assigned to the block of the flash memory by the switch means, the processing means may erase a memory content of the block of the flash memory assigned with the address space, and then may write the memory content of the block of the storage means assigned with the address space in the block of the flash memory assigned with the address space.

With this arrangement, data can be rewritten by the same processing in the flash memory which already stores some information.

The start program and the flash memory write program may be stored in the same block of the storage means.

Further, the selection means can be constituted as follows.

(1) When the processing means determines completion of write of a memory content of an arbitrary block of the storage means in an arbitrary block of the flash memory, the selection means controls switch of assignment of the address space by the switch means in order to allow the switch means to assign address spaces to another block of the storage means and another block of the flash memory.

(2) The selection means controls the switch means in response to an external operation.

With arrangement (1), all the memory contents of the storage means can be sequentially written in the flash memory by processing based on the program.

With arrangement (2), in accordance with operation of the user, data can be written in a desired area of the flash memory, or only necessary information can be written.

The storage means may comprise a RAM, and the external apparatus further may comprise an input/output unit which writes information in the storage means.

With this arrangement, data and a program to be written in the flash memory can be managed as files.

DETAILED DESCRIPTION OF PREFERRED EMBODIMENT

An embodiment of the present invention will be described below with reference to the accompanying drawings.

Figure 3:
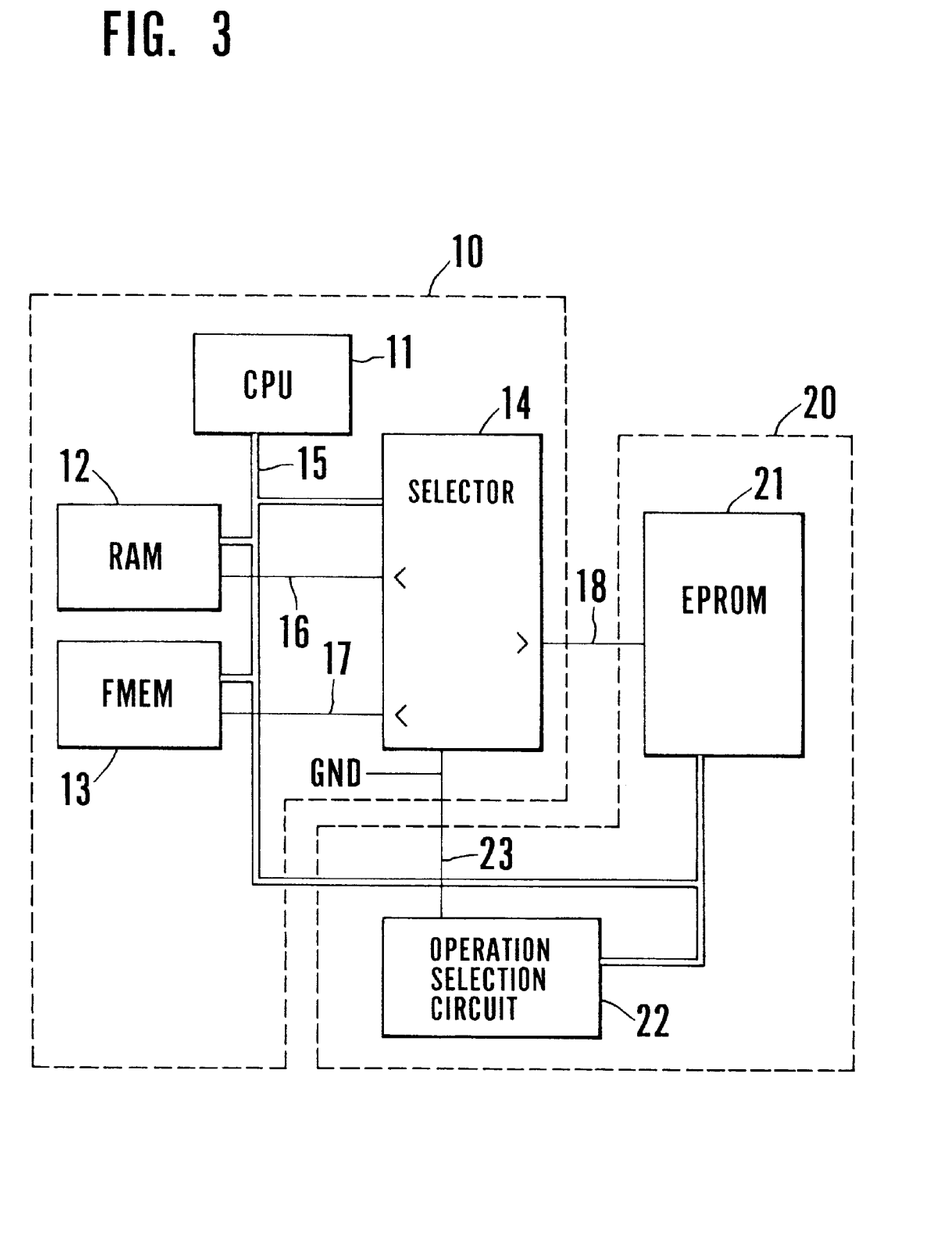
FIG. 3 is a block diagram showing the arrangement of a computer system to which the present invention is applied.

FIG. 3 is a block diagram showing the arrangement of a computer system to which the present invention is applied.

This computer system is constituted by a CPU panel 10 as a main body, and an external panel 20. The external panel 20 is connected to the CPU panel 10 via a connector (not shown) to be attached to or detached from the CPU panel 10 by plugging in or out the connector. The connector includes the respective pins of a bus 15 (to be described later), and signal lines for an EPROM select signal 18 and a selector operation select signal 23.

The CPU panel 10 is constituted by a CPU 11, a RAM 12, a flash memory (FMEM) 13, and a selector 14. The external panel 20 is constituted by an EPROM 21 and an operation selection circuit 22. All the CPU 11, the RAM 12, the FMEM 13, the selector 14, the EPROM 21, and the operation selection circuit 22 are connected to the bus 15. The bus 15 includes both address and data buses.

The CPU 11 controls the respective devices and signals, assigns its address space, and executes a copy program (to be described later). The address space of the CPU 11 has a size of 1 MB (00000h-FFFFFh), which is divided into four blocks (A: 00000h-3FFFFh), (B: 40000h-7FFFFh), (C: 80000h-BFFFFh), and (D: C0000h-FFFFFh). In copy processing (to be described later), an address space B is used as a copy source, and an address space C as a copy destination. The IPL starts from the address of an address space D.

The RAM 12 has a size of 256 KB, and is used as a work area of the program, or the like. The FMEM 13 has a size of 768 KB, and can be erased in units of blocks each having 256 KB (the respective blocks will be referred to as FMEMs ① to ③ hereinafter). No data is written in the FMEM 13 in the manufacturing stage of the CPU panel 10, and a program and data are written therein by an operation (to be described later). The EPROM 21 has a size of 768 KB, and divided into blocks each having 256 KB (the respective blocks will be referred to as EPROMs ① to ③ hereinafter). EPROM ① stores data (to be referred to as data ① hereinafter) to be written in the FMEM 13, EPROM ② stores a program (to be referred to as program ① hereinafter) to be written in the FMEM 13, and EPROM ③ stores the IPL of the CPU 11 and a write program for the FMEM 13 (to be referred to as program ② hereinafter).

The selector 14 selects a memory to be accessed by the CPU 11, and a block in the memory to switch assignment of the address space. That is, the selector 14 assigns an address space to the RAM 12 by a RAM select signal 16, the FMEM 13 by an FMEM select signal 17, or the EPROM 21 by the EPROM select signal 18. The signal lines of the select signals 17 and 18 are arranged in correspondence with each block. The select signals 16 to 18 include signals for instructing assignment of the address space. Information necessary for outputting the select signals 16 to 18 is information input from the CPU 11 via the bus 15, and the selector operation select signal 23 input from the operation selection circuit 22. When the external panel 20 is not connected to the CPU panel 10 (no selector operation select signal 23 is input to the selector 14), the selector 14 does not output any EPROM select signal 18.

The operation selection circuit 22 outputs the selector operation select signal 23 in order to change the destination of an enable signal, to each memory, output from the selector 14 on the basis of an address bus signal output from the CPU 11. The operation selection circuit 22 operates to select an arbitrary memory in accordance with a control signal from the CPU 11 and the address bus signal output from the CPU 11. When the write program for the FMEM 13 is executed, the operation selection circuit 22 operates to copy data from the EPROM 21 to the FMEM 13 by a series of operations.

The operation in this embodiment will be described below.

FIGS. 4A to 8B are views, respectively, for explaining assignment of the address space and the memory contents of the flash memory in the respective stages of the operation of this embodiment. The respective stages of the operation will be sequentially explained as patterns 1 to 5.

Pattern 1

This pattern shows a state wherein the CPU panel 10 is manufactured.

Figure 4A:
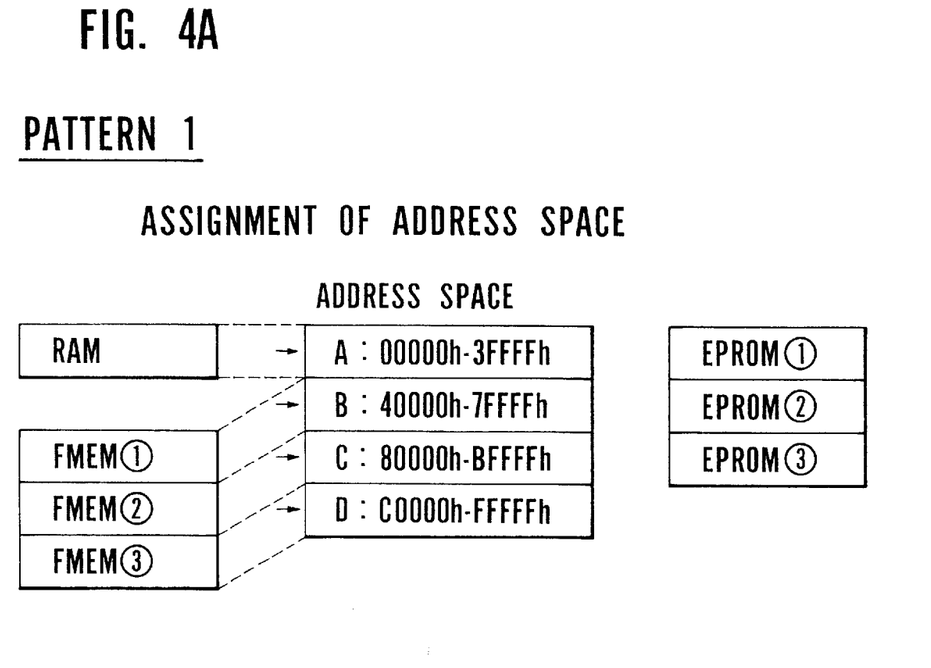
FIGS. 4A and 4B are views, respectively, for explaining assignment of the address space and the memory contents of a flash memory in pattern 1.

The external panel 20 is not connected to the CPU panel 10, and the selector 14 does not receive any selector operation select signal 23. In this stage, no address space is assigned to the EPROM 21. As shown in FIG. 4A, the address A space is assigned to the RAM 12; the address space B, to FMEM ①; the address space C, to FMEM ②; and, the address space D, to FMEM ③.

Figure 4B:
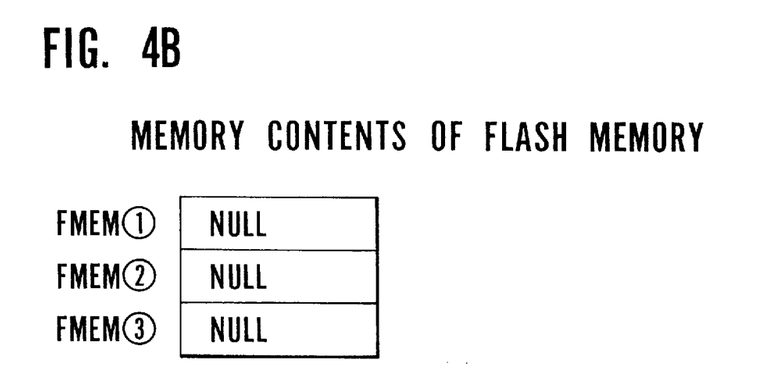

In this state, the FMEM 13 stores no data (is NULL), as shown in FIG. 4B. Therefore, no IPL exists in the address space D. Even if the power supply of the system is turned on, the CPU 11 does not start.

Pattern 2

This pattern shows an initial state wherein the external panel 20 is connected to the CPU panel 10.

Figure 5A:
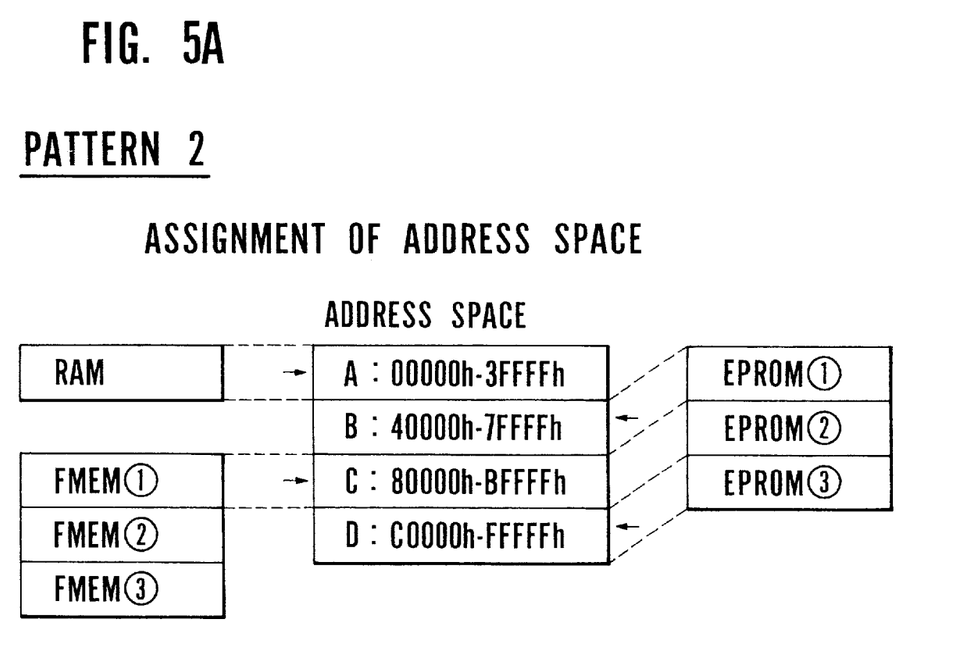
FIGS. 5A and 5B are views, respectively, for explaining assignment of the address space and the memory contents of the flash memory in pattern 2.

In this stage, the address space is assigned such that the address space A is assigned to the RAM 12; the address space B, to EPROM ①; the address space C, to FMEM ①; and, the address space D, to EPROM ③, as shown in FIG. 5A.

When the power supply of the system is turned on in this state, the CPU 11 outputs an address bus signal, the selector 14 outputs an EPROM select signal 18 in response to a selector operation select signal 23. When the CPU 11 accesses the address of the IPL in the address space D, it can access the EPROM 21 by the EPROM select signal 18 to start the IPL, thereby starting the system. Upon starting the IPL, the write program for the FMEM 13 takes control.

The CPU 11 performs processing through the following procedure based on the write program for the FMEM 13.

(1) The memory contents in the address space C (FMEM ① in this state) are erased (although this operation need not be performed in this state because no data is written in FMEM ①, a rewrite can be executed on the basis of the same program if this operation is performed).

(2) The memory contents in the address space B (EPROM ① in this state) are copied to the address space C.

(3) A verify check is performed for the memory contents in the address spaces B and C (the data in the copy source is compared with the data in the copy destination).

Figure 5B:
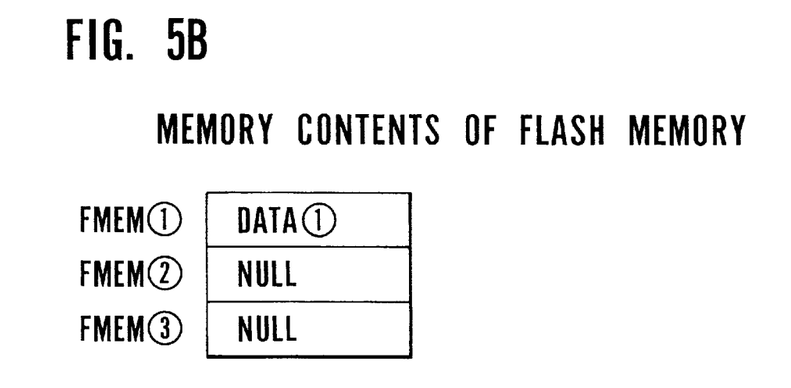

The contents of the FMEM 13 upon completion of this operation are data ① in FMEM ①, NULL in FMEM ②, and NULL in FMEM ③, as shown in FIG. 5B.

Pattern 3

Upon completion of the operation of pattern 2, the CPU 11 sends a control signal to the operation selection circuit 22. The operation selection circuit 22 outputs a selector operation select signal 23 in order to change the destination of an enable signal, to each memory, output from the selector 14.

Figure 6A:
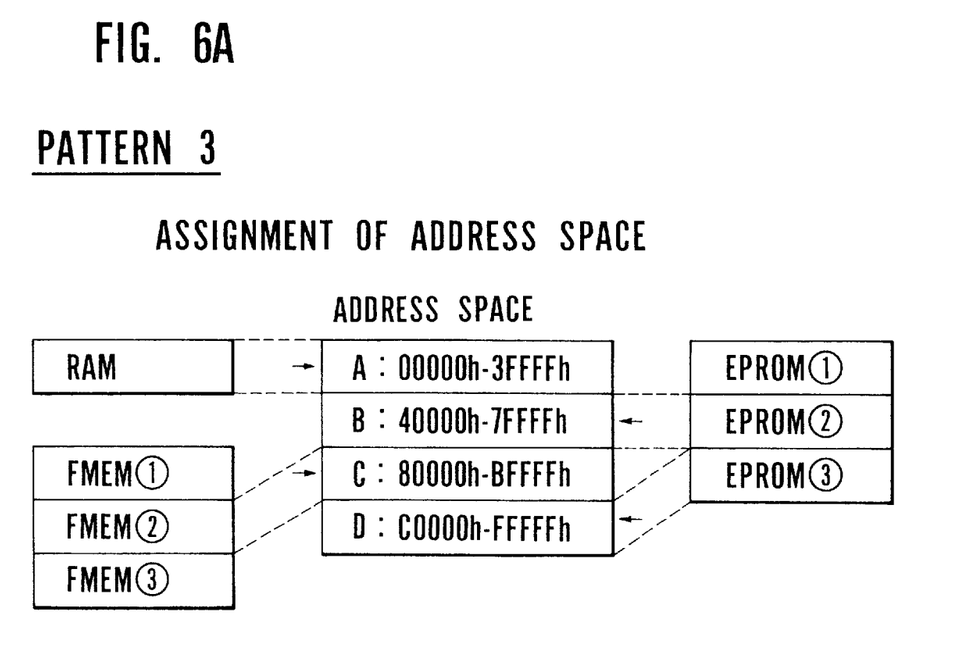
FIGS. 6A and 6B are views, respectively, for explaining assignment of the address space and the memory contents of the flash memory in pattern 3.

In this stage, the address space is assigned such that the address space A is assigned to the RAM 12; the address space B, to EPROM ②; the address space C, to FMEM ②; and, the address space D, to EPROM ③, as shown in FIG. 6A.

The CPU 11 performs processing through the following procedure based on the write program for the FMEM 13.

(1) The memory contents in the address space C (FMEM ② in this state) are erased.

(2) The memory contents in the address space B (EPROM ② in this state) are copied to the address space C.

(3) A verify check is performed for the memory contents in the address spaces B and C (the data in the copy source is compared with the data in the copy destination).

Figure 6B:
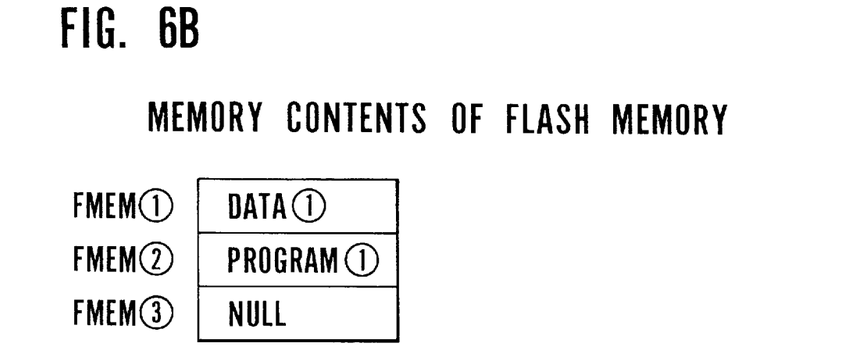

The contents of the FMEM 13 upon completion of this operation are data ① in FMEM ①, program ① in FMEM ②, and NULL in FMEM ③, as shown in FIG. 6B.

Pattern 4

Upon completion of the operation of pattern 3, the CPU 11 sends a control signal to the operation selection circuit 22. The operation selection circuit 22 outputs a selector operation select signal 23 in order to change the destination of an enable signal, to each memory, which is output from the selector 14.

Figure 7A:
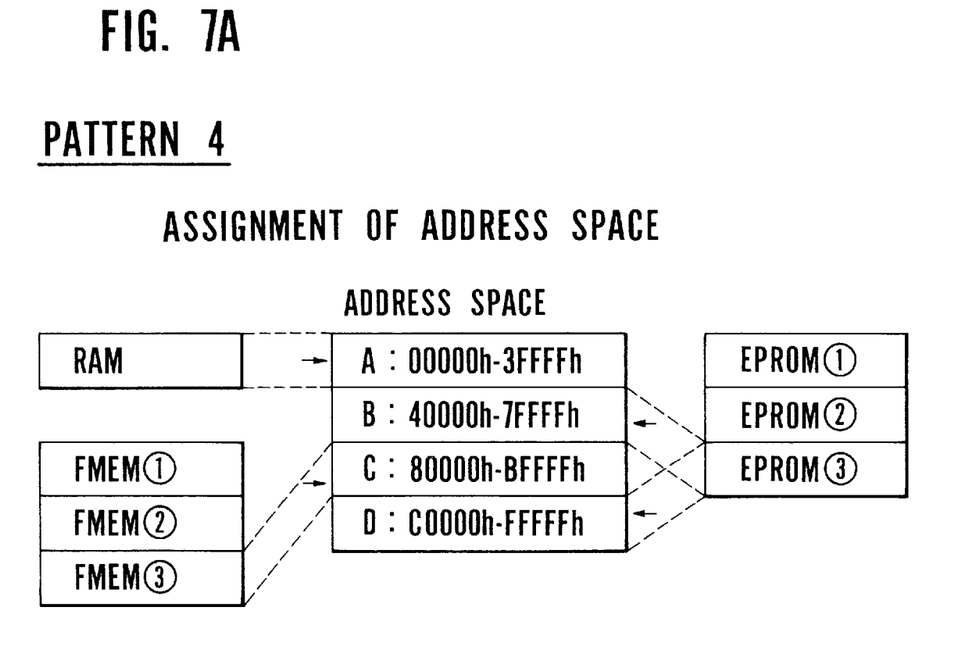
FIGS. 7A and 7B are views, respectively, for explaining assignment of the address space and the memory contents of the flash memory in pattern 4.

In this stage, the address space is assigned such that the address space A is assigned to the RAM 12; the address space B, to EPROM ③; the address space C, to FMEM ③; and, the address space D, to EPROM ③, as shown in FIG. 7A.

The CPU 11 performs processing through the following procedure based on the write program for the FMEM 13.

(1) The memory contents in the address space C (FMEM ③ in this state) are erased.

(2) The memory contents in the address space B (EPROM ③ in this state) are copied to the address space C.

(3) A verify check is performed for the memory contents in the address spaces B and C (the data in the copy source is compared with the data in the copy destination).

Figure 7B:
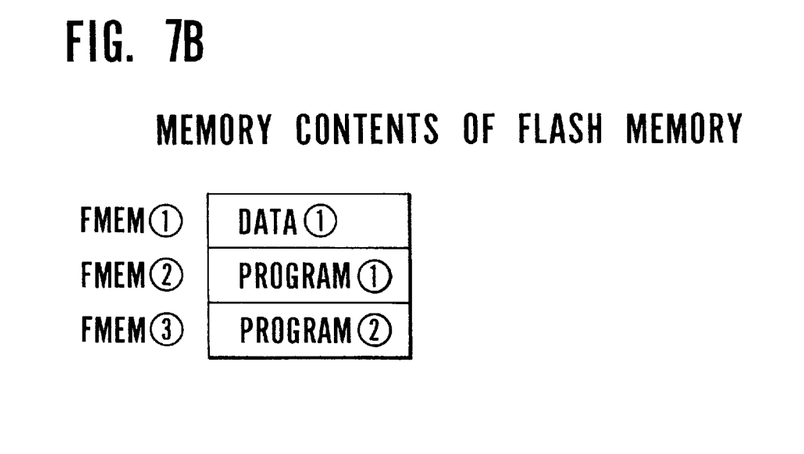

The contents of the FMEM 13 upon completion of this operation are data ① in FMEM ①, program ① in FMEM ②, and program ② in FMEM ③, as shown in FIG. 7B. With this processing, all the data and program have been copied from the EPROM 21 to the FMEM 13.

If assignment of the address space is sequentially switched in this manner, the contents of the EPROM 21 can be copied to the FMEM 13 by repeatedly executing just the same processing.

Pattern 5

This pattern shows a state wherein the external panel 20 is disconnected from the CPU panel 10 upon completion of copying from the EPROM 21 to the FMEM 13.

Figure 8A:
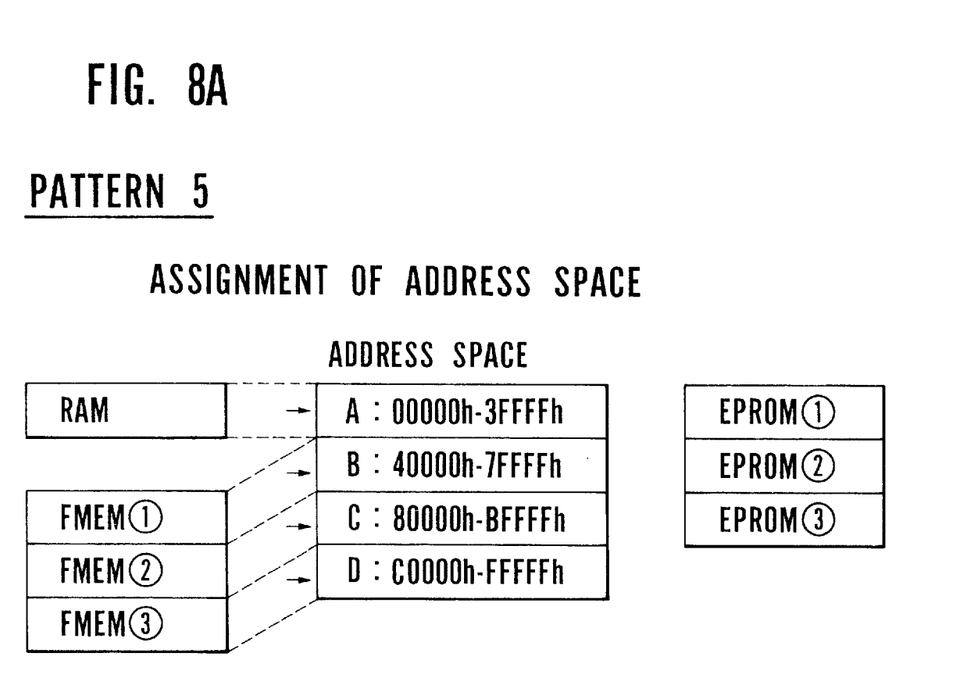
FIGS. 8A and 8B are views, respectively, for explaining assignment of the address space and the memory contents of the flash memory in pattern 5.

The external panel 20 is not connected to the CPU panel 10, and the selector 14 does not receive any selector operation select signal 23. Therefore, similar to pattern 1, the address space A is assigned to the RAM 12; the address space B, to FMEM ①; the address space C, to FMEM ②; and, the address space D, to FMEM ③, as shown in FIG. 8A.

Figure 8B:
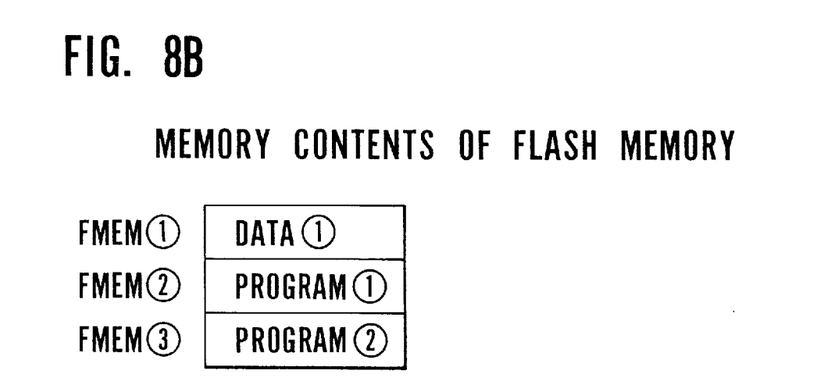

As shown in FIG. 8B, program ② including the IPL is stored in FMEM ③ assigned with the address space D. Therefore, if the power supply of the system is turned on in this state, the CPU 11 is started by the IPL stored in FMEM ③.

Rewrite to the FMEM 13 can also be performed by the operations of patterns 2 to 4 described above.

As described above, according to this embodiment, the CPU 11 can be started by the IPL stored in EPROM ③, and information stored in the EPROM 21 can be written in the FMEM 13 in accordance with the write program for the FMEM 13 which is stored in EPROM ③. As a result, no IPL and no write program for the FMEM 13 need be written in the FMEM 13 by using a memory writer before the FMEM 13 is mounted on the board of the CPU panel 10, and the work cost can be reduced.

If each of the blocks of the FMEM 13 and the EPROM 21 is smaller than the ⅓ address space of the CPU, data can be written in a flash memory by the same method as in the above embodiment. That is, in the above embodiment, even if the capacities of the FMEM 13 and the EPROM 21 are larger than the ½ address space of the CPU 11, data can be copied from the EPROM 21 to the FMEM 13 only by switching assignment of the address space. Accordingly, indirect copying using the RAM 12 as a work area can be omitted, and data can be written in the flash memory at a very high speed.

The data memory medium serving as a copy source may be a flash memory, in addition to the EPROM.

The above embodiment can be modified as follows.

[Modification 1]

The IPL and the write program for the FMEM 13 may be stored in different blocks. Also in this case, the present invention can be practiced by the following processing. In this modification, the IPL is stored in EPROM ②, and the write program for the FMEM 13 in EPROM ③.

When the external panel 20 is connected to the CPU panel 10, the operation selection circuit 22 outputs a selector operation select signal 23 so as to assign the address space D to EPROM ②. If the power supply of the system is turned on, the CPU 11 is started by the IPL stored in EPROM ②.

After the IPL starts, the CPU 11 sends a control signal to the operation selection circuit 22. Upon reception of the control signal, the operation selection circuit 22 outputs a selector operation select signal 23 so as to assign the address space A to the RAM 12, the address space B to EPROM ①, the address space C to FMEM ①, and the address space D to EPROM ③.

Then, the operation selection circuit 22 sends a control signal to the CPU 11. Upon reception of the control signal, the CPU 11 starts the write program for the FMEM 13 which is stored in EPROM ③. Subsequently, the same processing as in the above embodiment is performed using the address space B as a copy source and the address space C as a copy destination.

According to this method, data can also be written in the FMEM 13.

[Modification 2]

Figure 9:
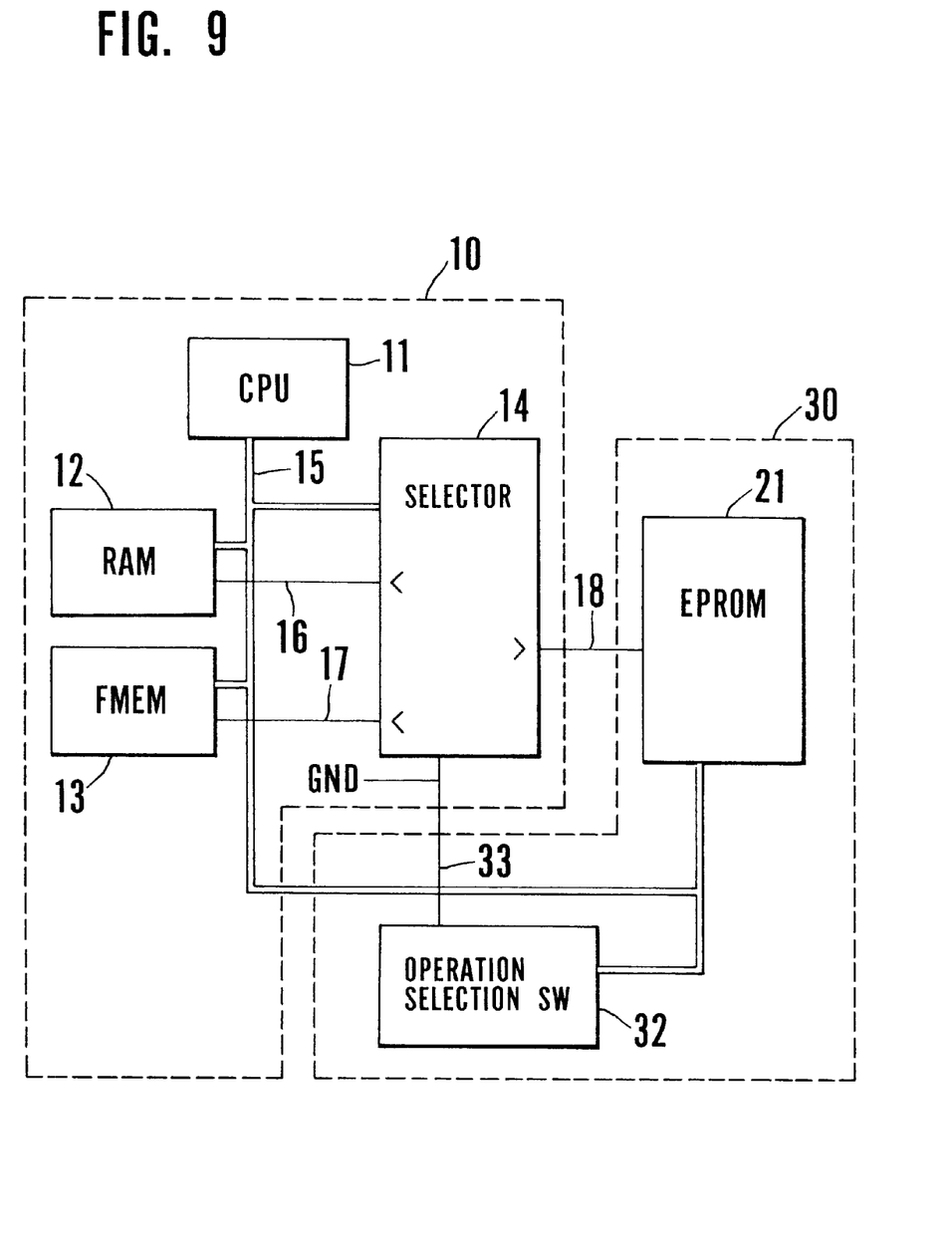
FIG. 9 is a block diagram showing the arrangement of a computer system according to another embodiment of the present invention.

FIG. 9 is a block diagram showing the arrangement of another computer system to which the present invention is applied.

In this computer system, an operation selection SW 32 is arranged on an external panel 30, instead of the operation selection circuit 22. The operation selection SW 32 has an operation lever to allow the user to switch the address space by operating this operation lever.

In this system, the user can write only necessary information stored in the EPROM 21 in a desired area of the FMEM 13.

[Modification 3]

Figure 10:
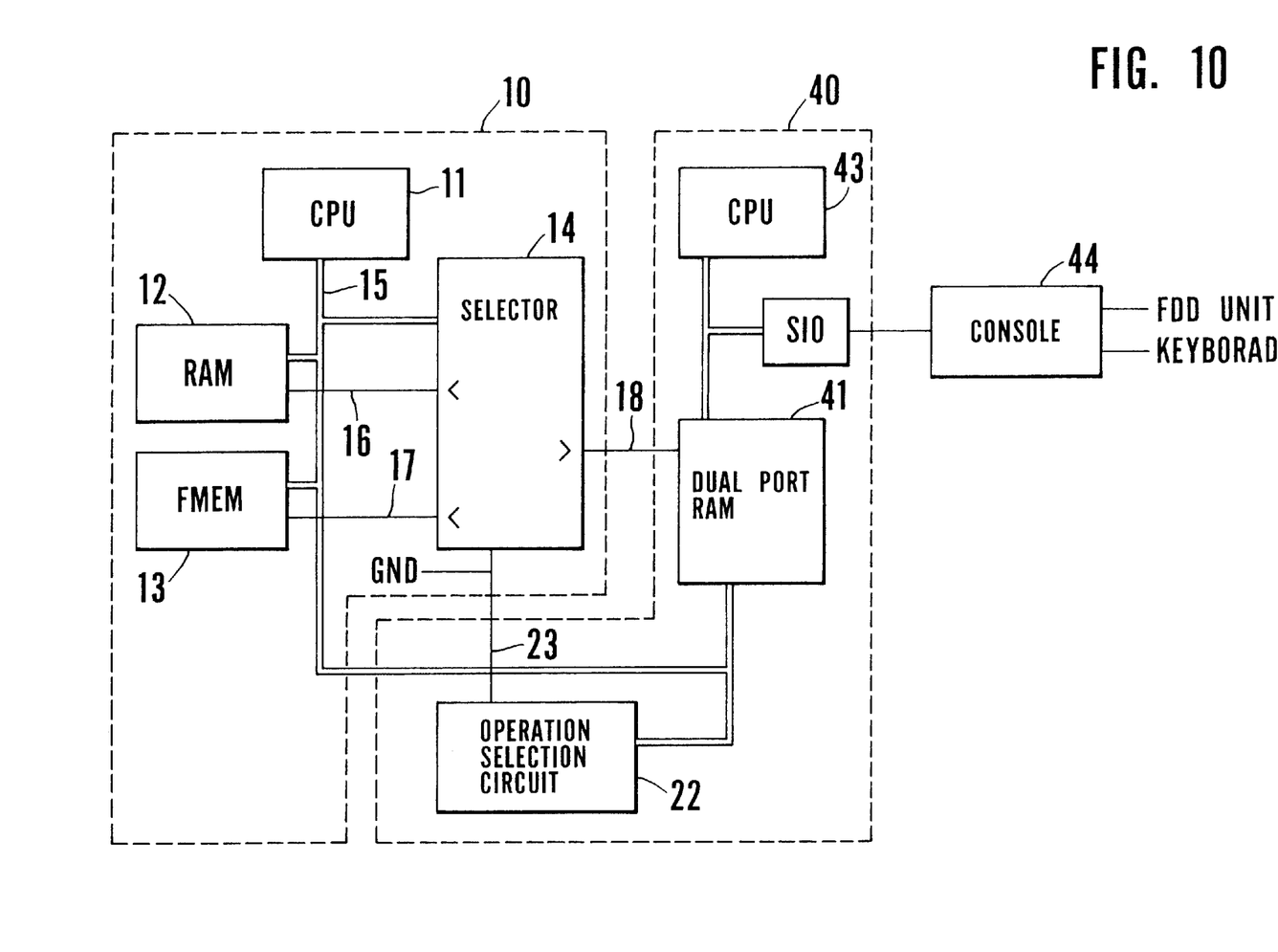
FIG. 10 is a block diagram showing the arrangement of a computer system according to still another embodiment of the present invention.

FIG. 10 is a block diagram showing the arrangement of still another computer system to which the present invention is applied.

In this computer system, a dual port RAM 41 is arranged on an external panel 40, instead of the EPROM 21. The dual port RAM 41 can be accessed by not only the CPU 11 of the CPU panel 10 but also a CPU 43 of the external panel 40. Data can be read/written out/in the dual port RAM 41 from an input/output unit such as a keyboard or an FDD via a console 44.

An example of the operation in this system will be described.

The CPU 43 writes data stored in the FD in the dual port RAM 41 via the console 44. With this operation, information to be written in the FMEM 13 is written in the dual port RAM 41. With the dual port RAM 41 replacing the EPROM 21, the remaining operation can be performed by the same processing as in the above embodiment.

According to this system, since a program and data to be sent to the CPU panel 10 (to be written in the FMEM 13) can be managed as files, the write and management costs can be reduced, compared to the case wherein a ROM for storing the program and data are prepared.

The dual port RAM 41 may be replaced with a normal RAM which can be accessed from both the CPU 11 of the CPU panel 10 and the CPU 43 of the external panel 40 via the bus 15. In this case, the console 44 is also connected to the bus 15.

What we claim is:

1. A flash memory writing method comprising the steps of:

providing a computer system having a main apparatus and an external apparatus detachable from said main apparatus, said main apparatus having processing means having a predetermined address space, switch means for switching assignment of the address space of said processing means, and a flash memory having a storage capacity more than ½ the predetermined address space in which a memory content can be erased in units of blocks each having a size not larger than ⅓ the address space, and an arbitrary address space can be assigned to each block, said external apparatus having storage means having a storage capacity larger than ½ the predetermined address space in which an arbitrary address space can be assigned to each block having a size not more than ⅓ the address space, and selection means for controlling switch of assignment of the address space of said switch means of said storage means;

storing a start program for said processing means in at least one block of said storage means, and storing a write program for said flash memory in at least one block of said storage means;

using said selection means to control said switch means so as to assign first portion of the address space to the at least one block of said storage means storing the start program, thereby starting said processing means on the basis of the start program stored in said storage means; and using said selection means to control said switch means so as to assign sequentially the first portion of the address space to the block of said storage means storing the write program for said flash memory and to at least another block of said storage means, and to assign sequentially a second portion of the address space to blocks of said flash memory, and writing a memory content of the respective blocks of said storage means to the respective blocks of said flash memory on the basis of the flash memory write program stored in said storage means.

2. A method according to claim 1, further comprising the step of erasing a memory content of the respective block of said flash memory before writing the memory content of the respective block of said storage means.

3. A method according to claim 1, wherein the start program and the flash memory write program are stored in the same block of said storage means.

4. A method according to claim 1, wherein, when said processing means determines completion of write of a memory content of an arbitrary block of said storage means in an arbitrary block of said flash memory, said selection means controls switch of assignment of the address space by said switch means in order to allow said switch means to assign address spaces to another block of said storage means and another block of said flash memory.

5. A method according to claim 1, wherein said selection means controls said switch means in response to an external operation.

6. A method according to claim 1, wherein said storage means comprises a RAM, and said external apparatus further comprises an input/output unit which writes information in said storage means.

7. A flash memory writing method for a computer system having a processor with a predetermined address space, a flash memory, and an external memory, the method comprising the steps of:

storing each of plural data/programs in respective blocks of the external memory, wherein the external memory has a storage capacity more than one-half the address space and each of the blocks has a memory capacity not larger than one-third the address space, and wherein the flash memory has a storage capacity more than one-half the address space arranged in blocks each having a memory capacity not larger than one-third the address space;

assigning a first portion of the address space to a first block of the external memory and assigning a second portion of the address space to a first block of the flash memory, and copying the first portion to the second portion so that the data/program in the first block of the external memory is in the first block of the flash memory; and reassigning the first portion of the address space to a second block of the external memory and reassigning the second portion of the address space to a second block of the flash memory, and, after erasing the second portion, copying the first portion to the second portion so that the data/program in the second block of the external memory is in the second block of the flash memory.

8. The method of claim 7, further comprising the step of reassigning the first portion of the address space to a third block of the external memory and reassigning the second portion of the address space to a third block of the flash memory, and copying the first portion to the second portion so that the data/program in the third block of the external memory is in the third block of the flash memory.

9. The method of claim 7, further comprising the step of assigning a third portion of the address space to a RAM having a memory capacity not larger than one-third the address space.

* * * * *